Oct. 15, 1968  J. F. CACHAT ET AL  3,406,271
IMPEDOR FOR A TUBE MILL
Filed May 15, 1964  2 Sheets-Sheet 1
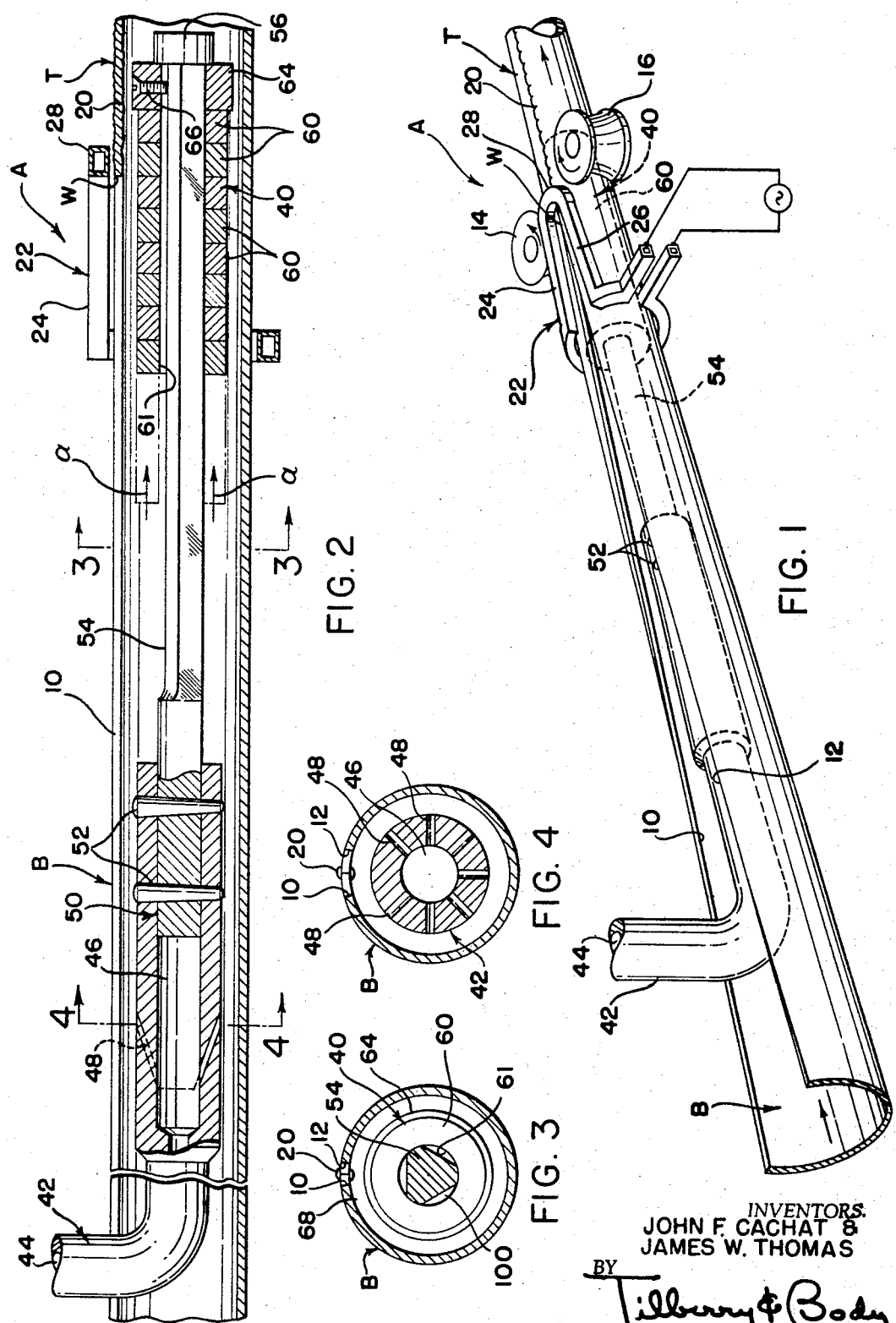
INVENTORS.
JOHN F. CACHAT &
JAMES W. THOMAS
BY
Tilberry & Body
ATTORNEYS Oct. 15, 1968  J. F. CACHAT ET AL  3,406,271
IMPEDOR FOR A TUBE MILL
Filed May 15, 1964  2 Sheets-Sheet 2
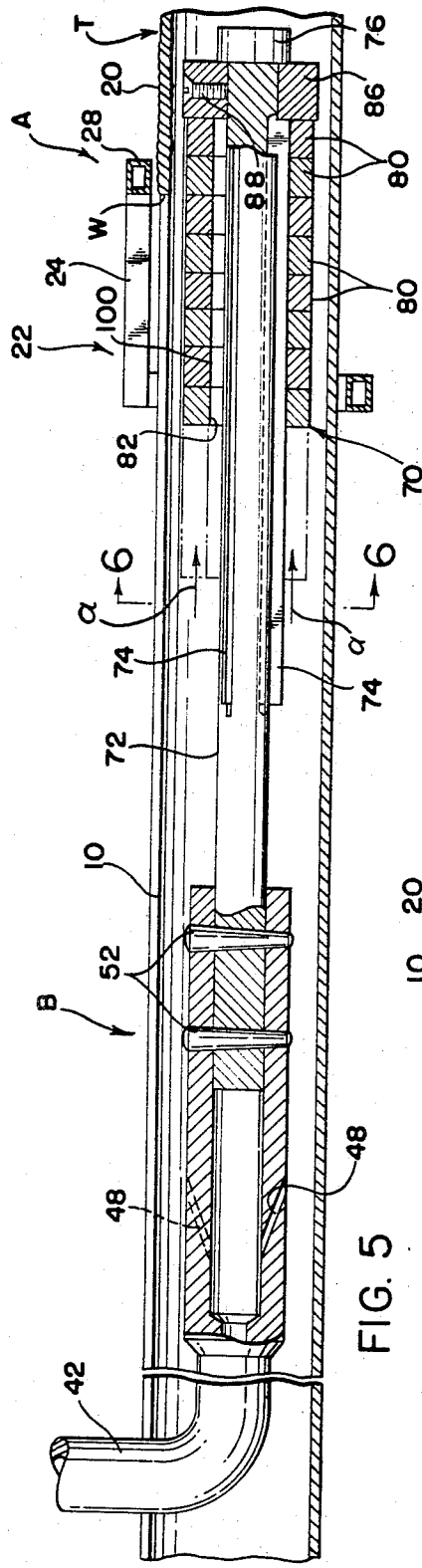
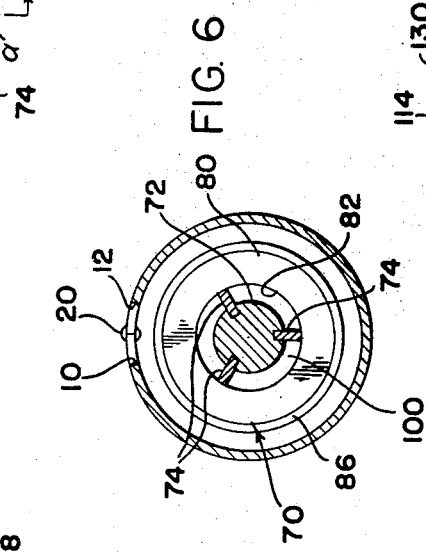
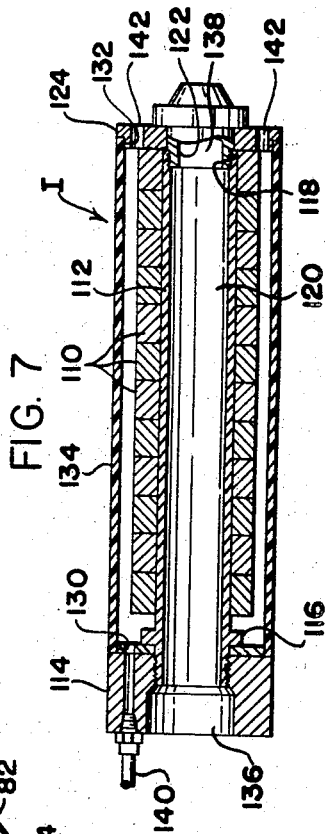
INVENTORS.
JOHN F. CACHAT &
JAMES W. THOMAS
BY
Tillbury & Body
ATTORNEYS

United States Patent Office 3,406,271
Patented Oct. 15, 1968

3,406,271
IMPEDOR FOR A TUBE MILL
John F. Cachat, Cleveland, and James W. Thomas, Brookpark Village, Ohio, assignors to Park-Ohio Industries, Inc., a corporation of Ohio
Filed May 15, 1964, Ser. No. 367,780
1 Claim. (Cl. 219—8.5)

ABSTRACT OF THE DISCLOSURE

A tube mill for high frequency welding includes an impedor which is advanced along the converging edges of the tube being formed. The impedor consists of a support rod which extends into the tube and is connected to a support arm at one end. A plurality of high permeability rings are removably supported at the free end so that rings of different diameters can be substituted to conform to the diameter of the tube being formed. A coolant is forced against the rings to hold them in the desired position on the support rod.

---

The present invention pertains to the art of tube mills and more particularly to an impedor for a tube mill.

This invention is particularly applicable to an impedor for a tube mill which uses induction heating for welding the converging edges of an advancing skelp into a continuous tube or tubing and it will be described with particular reference thereto; however, it will be appreciated that the invention has much broader applications and an impedor, constructed in accordance with the invention, may be used in a tube mill of the type which uses conduction heating, instead of induction heating, for welding the converging edges of the advancing skelp.

Seam welded metal tubing is generally formed by an apparatus, usually referred to as a tube mill, wherein a flat metal strip, known as a skelp, is formed into a tube or tubing by bringing the edges of the skelp together and then seam welding the edges to form the tubing. As the metal skelp is moving longitudinally through the tube mill, the edges gradually converge at a point, generally referred to as the welding point, and an alternating current is caused to flow along the converging edges and across the welding point. In this manner, the converging edges are preheated and then raised to the welding temperature at the welding point, where they are welded together. In accordance with the contemplation of the present invention, the current flow along the converging edges and across the welding point is caused by an inductor spaced above the edges and the welding point and energized by a high frequency power source. In such an apparatus, it has become common practice to provide an impedor within the tube or tubing and directly below the converging edges and the welding point. This impedor is formed from a high permeability material, such as a ferrite, and causes the current to be concentrated along the edges and across the welding point.

To support the impedor within the tube or tubing, it has been general practice to fixedly secure the impedor onto a support rod extending from a position where the skelp has not been completely formed into a tube, to a position where the skelp has been formed into a tube. The known impedors had fixed lengths and diameters; therefore, when the tube mill was changed over to produce a different size tube or tubing, a completely different impedor was often required. Consequently, it was necessary to have a supply of impedors with various diameters and lengths so that the tube mill could be quickly converted from one size tubing to another. These many impedors were expensive and required a substantial amount of space for storage; therefore, there has been a demand for an impedor which could be adjusted to accommodate the production of various size tubings. Until the present invention, no satisfactory adjustable impedor has been developed.

The present invention is directed toward an impedor construction where the length and diameter of the impedor itself can be easily changed to accommodate various size tubings which are to be formed and seam welded in a tube mill.

In accordance with the present invention there is provided an impedor for a tube mill comprising a support rod and a plurality of axially aligned, high permeability rings removably secured onto the support rod.

By this construction, impedor rings of different diameters can be positioned over the rod to provide an impedor having the necessary diameter for accommodating any size tubing to be formed in the mill. Also, the number of impedor rings can be varied to change the length of the impedor. This ability to adjust the diameter and length of the impedor is a substantial advance over known impedor constructions.

In accordance with a more limited aspect of the present invention, an impedor as defined above is provided with a cover formed from electrical insulation material and positioned over the impedor rings in the area of the converging edges and means for removably securing the cover onto the support rod. This cover is positioned between the skelp and the impedor ring; therefore, any metal splattering from the welding point, during the seam welding of the tubing, will not erode or otherwise damage the impedor rings.

The primary object of the present invention is the provision of an impedor for a tube mill which impedor can be easily adjusted in length and diameter to accommodate tubing of various sizes being formed in the mill.

Another object of the present invention is the provision of an impedor for a tube mill which impedor is efficient in operation, easy to adjust in length and diameter and economical to produce.

Another object of the present invention is the provision of an impedor for a tube mill which impedor is formed from a plurality of axially aligned, high permeability rings removably secured onto a support rod.

Still another object of the present invention is the provision of an impedor for a tube mill which impedor is formed from a plurality of axially aligned, high permeability rings removably secured onto a support rod and a cover formed from electrical insulation material and positioned over the rings and removably secured to the same support rod.

These and other objects and advantages will become apparent from the following description used to illustrate the preferred embodiments of the invention as read in connection with the accompanying drawings in which:

FIGURE 1 is a perspective, somewhat schematic view illustrating the preferred embodiment of the present invention;

FIGURE 2 is a partial, cross-sectional, side elevational view illustrating the preferred embodiment of the present invention;

FIGURE 3 is a cross-sectional view taken generally along line 3—3 of FIGURE 2;

FIGURE 4 is a cross-sectional view taken generally along line 4—4 of FIGURE 2;

FIGURE 5 is a cross-sectional, side elevational view illustrating a modification of the preferred embodiment as shown in FIGURES 2–4;

FIGURE 6 is a cross-sectional view taken generally along line 6—6 of FIGURE 5; and FIGURE 7 is a somewhat schematic, cross-sectional side elevational view showing a further modification of the present invention.

Referring now to the drawings wherein the showings are for the purpose of illustrating preferred embodiments of the invention only and not for the purpose of limiting same, FIGURE 1 shows a tube mill A for forming skelp B into welded tubing T. In forming the tubing T, the edges 10, 12 of skelp B are forced to converge at a welding point W by a pair of pressure rolls 14, 16. A plurality of pressure rolls may be provided; however, for the purpose of simplicity, only rolls 14 and 16 are illustrated. Thereafter, in a manner to be hereinafter described, the converging edges 10, 12 are welded at a seam 20 so that the tubing T is a unitary structure.

To accomplish the welding operation, there is provided, in accordance with the preferred embodiment of the present invention, an inductor 22 surrounding the skelp B and having legs 24, 26 positioned above the converging edges 10, 12, respectively, and a nose 28 extending over to the welding point W. As a high frequency current is caused to flow within inductor 22 by a high frequency power source, schematically represented as generator 30, voltage potentials are induced in the skelp and these induced voltage potentals create current flow along the edges and cross the welding point. This current flow generates $I^2R$ heating within the converging edges and across the welding point so that the edges are preheated before reaching the welding point W and, when reaching the welding point, are raised to a temperature sufficient to allow pressure welding by the squeezing action of the pressure rolls 14, 16. The pressure welding of the converging edges causes the metal in edges 10, 12 to upset slightly which creates an upper and lower bead as shown in FIGURES 3 and 4. This bead is subsequently removed from the tubing T by internal and external skiving tools, not shown.

More efficient heating of the converging edges 10, 12 can be accomplished by providing an impedor within the tubing T and below the welding point W. Such an impedor will cause a concentration of current along the converging edges and at the welding point. In accordance with the illustrated embodiment of the present invention as shown in FIGURES 1 and 2, there is provided an impedor 40 supported below the welding point W by a support arm 42 having an internal coolant passage 44 for directing water, or another coolant, into a coolant chamber 46. A plurality of radially and longitudinally extending nozzle passages 48 communicate the coolant chamber 46 with the interior of skelp B so that the coolant can be expelled through the passages 48 into the interior of the skelp B. At the innermost end of support arm 42 there is provided a support rod 50 secured onto the support arm by tapered pins 52. The support rod has a longitudinally extending body portion 54 with a generally triangular cross section as illustrated in FIGURE 3 and a nose, or abutment 56, for a purpose to be hereinafter described in detail.

The impedor 40 includes a plurality of impedor rings 60, each having a central aperture 61 adapted to be slidably received on the triangular body portion 54 of support rod 50. The rings 60 are formed from a high permeability material, such as sintered or bonded ferrite, and the number of rings is determined by the desired axial length of the high permeability material necessary for the proper function of the impedor 40. The diameters of the rings 60 are determined by the size of the tubing T. As the tubing increases in diameter, larger diameter rings 60 are used so the outer edges of the rings are spaced only slightly from the cylindrical internal surface of the tubing T at all positions around the tubing.

It is common knowledge that the location of a high permeability material directly oposite the internal surface of the tubing T will increase the impedance of the portion of the tubing opposite the high permeability material. Consequently, with the rings 60 spaced only slightly from the cylindrical internal surface of the tubing T, the complete circumference of the tubing adjacent the rings 60 would have an increased impedance and the current would be forced to flow along the outer surface of the skelp. This increases the quality of the weld in a manner well known in the art of welding tubing. An end ring 64 is secured by screw 66 onto the rod 50 so that the rings 60 cannot slip off of rod 50. The nose or abutment 56 is secured onto the rod 50 at the innermost end so that the rings 60 and the ring 64 can be slipped over rod 50 to a position determine by the location of nose 56.

During operation, coolant, i.e. water, flows in the direction indicated by arrows $a$ in FIGURE 2 and this water flow tends to maintain the rings 60 against ring 64 at the innermost end of rod 50 so that they are positioned directly below the converging edges 10, 12 and the welding point W.

When a different size tubing T is to be formed by tube mill A, the rod 50 is removed from support arm 42 and new impedor rings 60 are positioned over the body portion 54. The apertures 61 of the new rings are the same diameter so that they will slide over body portion 54 and radially locate the rings with respect to the tubing T. In this manner, the replacement of the rings 60 can adapt impedor 40 for different size tubing. This is a substantial advance in the art of impedors since it is not necessary to supply a separate impedor for each different size tubing to be formed by mill A. The length of the high permeability portion of impedor 40 can be easily changed by changing the number, or thickness, of the rings.

A further modification of the preferred embodiment, as shown in FIGURES 1–4, is illustrated in FIGURES 5 and 6 wherein impedor 70 includes a support rod 72 having radially extending ribs 74 and a nose or abutment 76. Slidably received upon support rod 72 are a plurality of axially aligned impedor rings 80 having center apertures 82 adapted to match the outermost surfaces of ribs 74, as shown in FIGURE 6. A mounting ring 86 is attached onto rod 72 by a set screw 88. The rings 80 have an external diameter which allows them to be spaced only slightly from the internal surface of tubing T. If a different size tubing is to be used, the rod 72 is removed from arm 42 by removing pins 52. Thereafter, the impedor rings 80 and different size impedor rings are placed onto the rod 72. Then the rod 72 is again attached to the arm 42 so that the rings 80 are properly located in tubing T. Coolant flowing through orifices 48 maintains the rings 80 in their proper position below the converging edges 10, 12 and the welding point W.

By forming rods 50, 72 with a three point contact arrangement with the rings 60, 80, respectively, a coolant passage 100 is defined between the rods and the rings. See FIGURES 3 and 6. These coolant passages allow cooling of the internal surfaces of the rings to dissipate heat generated within the rings or conducted from the tubing to the rings. It is to be appreciated that these passages could be formed in various other manners, such as the provision of longitudinal grooves in the surface of the rods and having a different configuration from the grooves shown in FIGURE 3.

Referring now to FIGURE 7, impedor I includes impedor rings 110 positioned on a support rod 112 which is in turn threaded into end plate 114. A flange 116 on rod 112 allows the end plate to be locked onto the rod. Adjacent the opposite end, rod 112 has an internal threaded portion 118 in central bore 120. This threaded portion receives nipple 122 for holding end plate 124 against the end of rod 112. The spaced end plates have annular shoulders 130, 132 which support a sleeve 134 formed from an electrical insulation, wear resistant material such as Teflon or glass laminate. This sleeve provides a protective cover for the rings 110 so that the molten metal splattering from the welding point does not damage the rings.

To provide for coolant flow to an internal skiving tool to be mounted on the right end of impedor I in FIGURE 7, the end plate 114 has a coolant inlet 136 communicated with bore 120. The coolant flows through bore 120, to cool the rings 110, and then passes from the nipple 122 through passage 138. The rings are cooled directly by a coolant supplied to pipe 140 and into the chamber formed by sleeve 134. This coolant then exits through orifices 142 in end plate 124 into the interior of tubinb T.

The operation of impedor I in FIGURE 7 is not substantially different from the operation of the impedors 40 and 70 discussed before.

Another benefit of using the rings for building an impedor is that the rings are readily available in different diameters so that the cost of the rings is considerably less than the cost of providing a special impedor sleeve having a special diameter and length. This is especially true with respect to rings formed from bonded or sintered particulate, high permeability material which is well adapted for use on an impedor.

The present invention has been described in connection with two structural embodiments; however, it is to be appreciated that various structural changes may be made without departing from the intended spirit and scope of the present invention as defined in the appended claim.

Having thus described our invention, we claim:

1. An impedor for a tube mill including a longitudinally moving skelp having spaced edges, means for forcing said edges to converge at a welding point to form a tube and means for causing a welding current to flow along said edges and across said welding point to weld said edges together, said impedor comprising, a support rod adapted to extend in said tube to a position beyond said welding point, connecting means for connecting the rod at one end a plurality of axially aligned, high permeability rings slidably supported at the end of said rod opposite to said one and removably secured onto said rod, coolant outlet means being provided in said connecting means on said impedor for forcing a coolant into said tube in the direction of said rings, said rings being longitudinally spaced from said connecting means downstream of said coolant outlet means.

References Cited
UNITED STATES PATENTS

| | | | |
|---|---|---|---|
| 2,933,582 | 4/1960 | Tower | 219—8.5 |
| 3,004,134 | 10/1961 | Allardt | 219—59 |
| 3,127,674 | 4/1964 | Kohler | 219—8.5 X |
| 3,209,115 | 9/1965 | Van Iperen | 219—59 |
| 3,242,299 | 3/1966 | Laughlin et al. | 219—8.5 |

RICHARD M. WOOD, *Primary Examiner.*

J. G. SMITH, *Assistant Examiner.*